US012601194B2

(12) United States Patent
Kuffner et al.

(10) Patent No.: US 12,601,194 B2
(45) Date of Patent: Apr. 14, 2026

(54) C-CLAMP BODY AND METHOD OF MANUFACTURE THEREOF FOR SECURING A FLEXIBLE BUILDING WALL PANEL UNDER TENSION

(71) Applicant: GNB Global Inc., Selkirk (CA)

(72) Inventors: Joseph Kuffner, Selkirk (CA); Ryan Brand Hunter, Selkirk (CA); Alexander Paul Lentowich, Selkirk (CA)

(73) Assignee: GNB Global Inc., Selkirk (CA)

( * ) Notice: Subject to any disclaimer, the term of this patent is extended or adjusted under 35 U.S.C. 154(b) by 245 days.

(21) Appl. No.: 18/458,237

(22) Filed: Aug. 30, 2023

(65) Prior Publication Data

US 2024/0076887 A1 Mar. 7, 2024

Related U.S. Application Data

(60) Provisional application No. 63/403,115, filed on Sep. 1, 2022.

(51) Int. Cl.
*E04G 21/24* (2006.01)
*F16B 2/06* (2006.01)

(52) U.S. Cl.
CPC .............. *E04G 21/24* (2013.01); *F16B 2/065* (2013.01)

(58) Field of Classification Search
CPC .... F16B 2/065; F16L 3/24; F16L 3/11; B25B 5/101
See application file for complete search history.

(56) References Cited

U.S. PATENT DOCUMENTS

| | | | | | |
|---|---|---|---|---|---|
| 1,233,223 | A | * | 7/1917 | Hachmann | .............. B25B 5/101 269/249 |
| 2,133,892 | A | * | 10/1938 | Gelinski | ................. B25B 5/101 269/224 |
| 3,129,915 | A | * | 4/1964 | Budnick | ................... F16L 3/24 248/72 |
| D239,364 | S | * | 3/1976 | Mooney | ......................... D8/396 |
| D365,512 | S | * | 12/1995 | Mason | ........................... D8/394 |
| RE45,825 | E | * | 12/2015 | Magno, Jr. | ................. F16B 2/10 |
| D829,073 | S | * | 9/2018 | Starwood | ......................... D8/72 |
| 10,612,573 | B2 | * | 4/2020 | Recker | ....................... F16B 2/12 |
| 11,191,383 | B1 | * | 12/2021 | Hatton | ..................... A47H 1/04 |
| 11,898,361 | B2 | * | 2/2024 | Walraven | .............. E04G 21/242 |
| D1,057,210 | S | * | 1/2025 | Viberg | ......................... D25/133 |

* cited by examiner

*Primary Examiner* — Brian E Glessner
*Assistant Examiner* — Daniel J Kenny
(74) *Attorney, Agent, or Firm* — Ryan W. Dupuis; Kyle R. Satterthwaite; Ade & Company Inc.

(57) ABSTRACT

A clamp apparatus is used for securing one end of a flexible sheet spanning under tension across a building opening relative to a perimeter beam along the edge of the building opening. The clamp apparatus has a C-shaped channel body having (i) a first flange with a threaded bore therein to receive a bolt defining a first clamping jaw and (ii) a second flange defining an opposing second clamping jaw, whereby the clamp apparatus clamps a perimeter mounted flange of the flexible sheet onto a beam flange of the perimeter beam. C-shaped stiffener plates are mounted externally on the channel body, spaced apart from one another along the length of the channel body in perpendicular relation to the length to reinforce the clamp such that the clamp is able to withstand high wind forces acting on the tensioned sheet.

15 Claims, 4 Drawing Sheets

C-CLAMP BODY AND METHOD OF MANUFACTURE THEREOF FOR SECURING A FLEXIBLE BUILDING WALL PANEL UNDER TENSION

This application claims the benefit under 35 U.S.C. 119(e) of U.S. provisional application Ser. No. 63/403,115, filed Sep. 1, 2022.

FIELD OF THE INVENTION

The present invention relates to a clamp body that receives a threaded member therein to define a C-clamp and a method of forming the clamp body, and more particularly the present invention relates to a clamp body arranged to secure one edge of flexible wall panel relative to a building when the flexible wall panel undergoes significant tensioning.

BACKGROUND

During construction of various buildings, before permanent walls are constructed, it is known to temporarily enclose openings in the walls of the building frame using flexible sheet material spanning across the building openings to shield the interior of the building from outside weather including cold winds and precipitation. These flexible sheets are commonly mounted under considerable tension to resist wind loads by securing one edge of each sheet in a mounting channel secured to the building and using a tensioning mechanism that applies tension at the opposing end of the sheet. The mounting channel is desirably clamped to a suitable flange at the edge of the building opening to avoid any permanent fastener holes being formed in the building frame; however, many known C-clamps that may be used for clamping the mounting channel to a suitable building flange can be destructively spread open under extreme wind forces so that the sheet material is no longer effectively supported on the building frame.

SUMMARY OF THE INVENTION

According to one aspect of the invention there is provided a clamp apparatus for clamping an object using a threaded member, the clamp apparatus comprising:

a channel body having a C-shaped profile extending along a length of the channel body in a longitudinal direction between opposing ends of the channel, the channel body comprising (i) a first plate extending between the opposing ends along a first side of the channel body, (ii) a second plate extending between the opposing ends along a second side of the channel body, and (iii) a bridge plate joined between the first plate and the second plate along the length of the channel body so as to define the C-shaped profile of the channel body;

the channel body having a hollow interior which is open at the opposing ends of the channel body and which is open along an open side of the channel body opposite to the bridge plate along the length of the channel body between the opposing ends to receive the object to be clamped into the channel body through the open side;

stiffener plates mounted externally on the channel body so as to be spaced apart from one another in said longitudinal direction;

a threaded bore formed on the first plate to threadably receive the threaded member extending therethrough such that the threaded member protrudes into the hollow interior of the channel body to define a first clamping jaw opposite to the second plate which defines a second clamping jaw;

wherein each stiffener plate is joined to each one of the first plate, the second plate and the bridge plate of the channel body to protrude radially outward from each of the first plate, the second plate and the bridge plate, transversely to the longitudinal direction.

The configuration of the clamp apparatus described herein which uses stiffener plates secured externally to a channel body has been found to effectively withstand very large forces without spreading or coming apart even when used to secure a flexible sheet spanning a building opening under large wind forces.

Preferably the first plate and the second plate of the channel body are parallel to one another.

Preferably the stiffener plates lie perpendicular to the longitudinal direction of the channel body.

The stiffener plates preferably comprise two stiffener plates mounted adjacent the opposing ends of the channel body respectively.

The stiffener plates preferably further comprise two stiffener plates mounted on longitudinally opposing sides of the threaded bore received therebetween.

When each stiffener plate extends circumferentially partway about the channel member between two opposing end portions of the stiffener plate, each stiffener plate may be tapered in radial dimension at each of the opposing end portions thereof.

According to a further aspect of the present invention there is provided a method of forming the clamp apparatus comprising:

providing the channel body having the bridge plate connected between the first plate and the second plate thereof; and welding each stiffener plate externally onto channel body such that the stiffener plate is welded to each of the first plate, the second plate and the bridge plate of the channel body.

The method may further include forming the channel body from an extruded channel member.

The method may further include forming the threaded bore on the first plate by providing a threaded nut and welding the threaded nut onto the first plate in alignment with a through bore formed in the first plate.

According to a further aspect of the present invention, there is provided a wall panel system for a building opening comprising a perimeter beam with a beam flange extending across a first perimeter edge of the building opening, the system comprising:

a flexible sheet arranged to across the building opening between a first end portion and a second end portion of the flexible sheet;

a mounting member having (i) a mounting flange arranged for abutment alongside the beam flange of the head beam and (ii) a channel arranged to secure the first end portion of the flexible sheet therein;

a plurality of clamp apparatuses as described above which are arranged for clamping the mounting flange of the mounting member alongside the beam flange of the head beam; and a tensioning assembly arranged to secure the second end portion of the flexible sheet relative to a second perimeter edge of the building opening opposite to the first perimeter edge of the building opening such that the flexible sheet is under tension.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
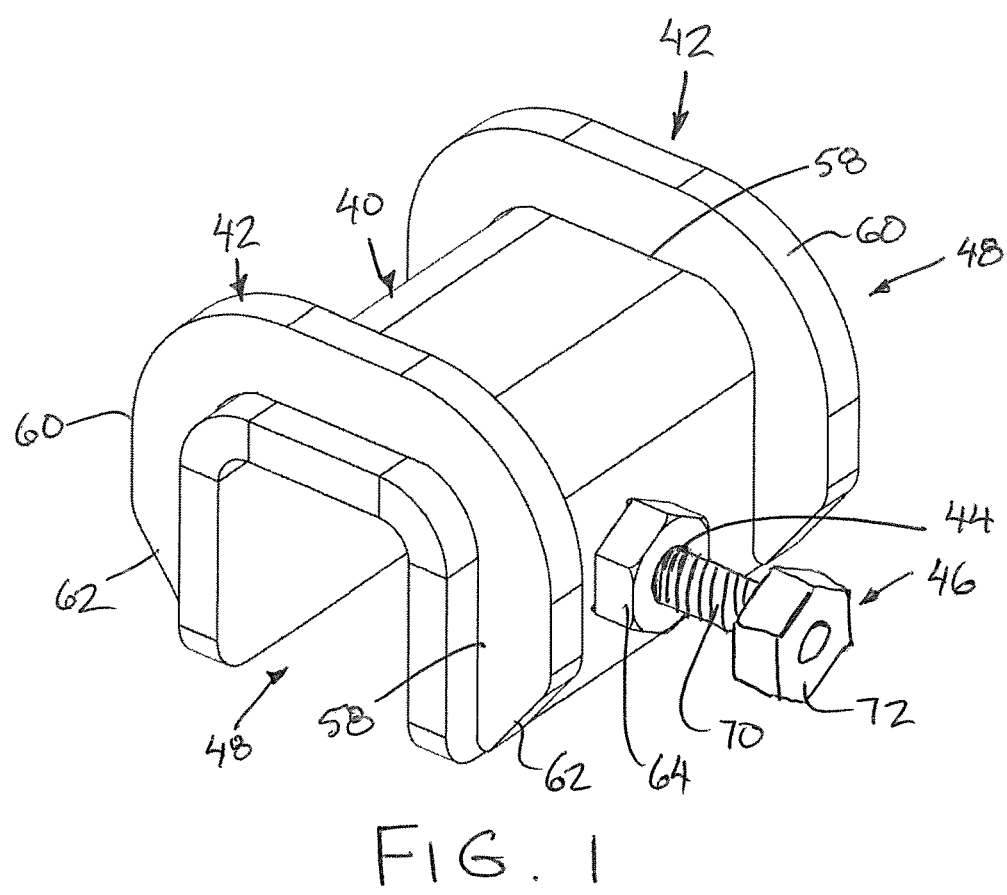
FIG. 1 is a perspective view of the clamp apparatus according to the present invention.
Figure 2:
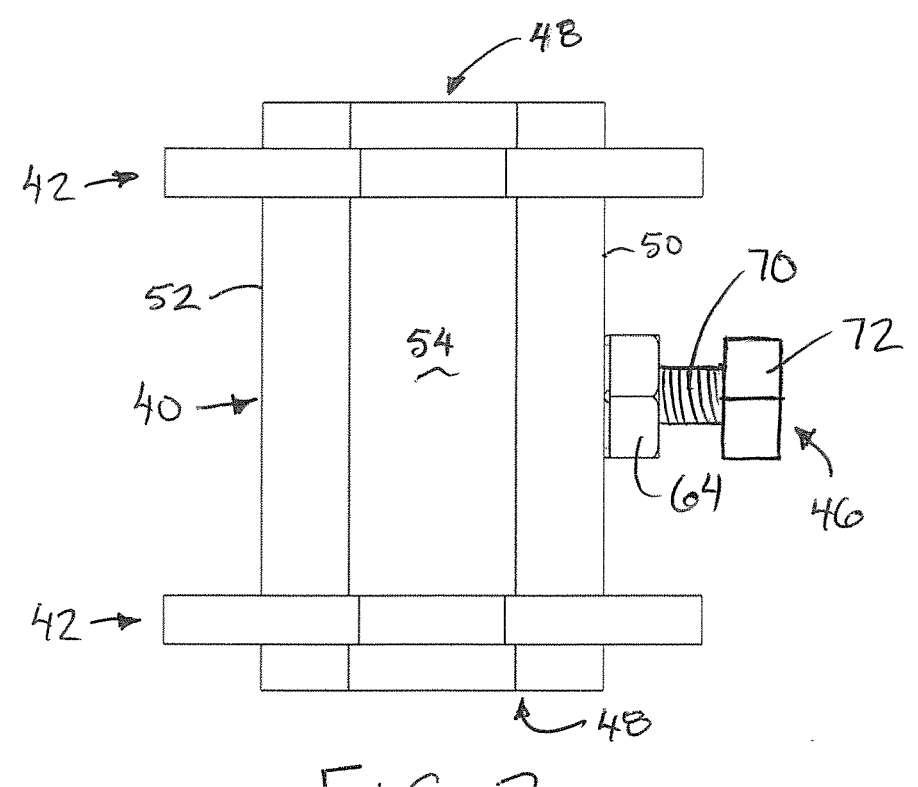
FIG. 2 is a top view of the clamp apparatus according to the first embodiment of FIG. 1.
Figure 3:
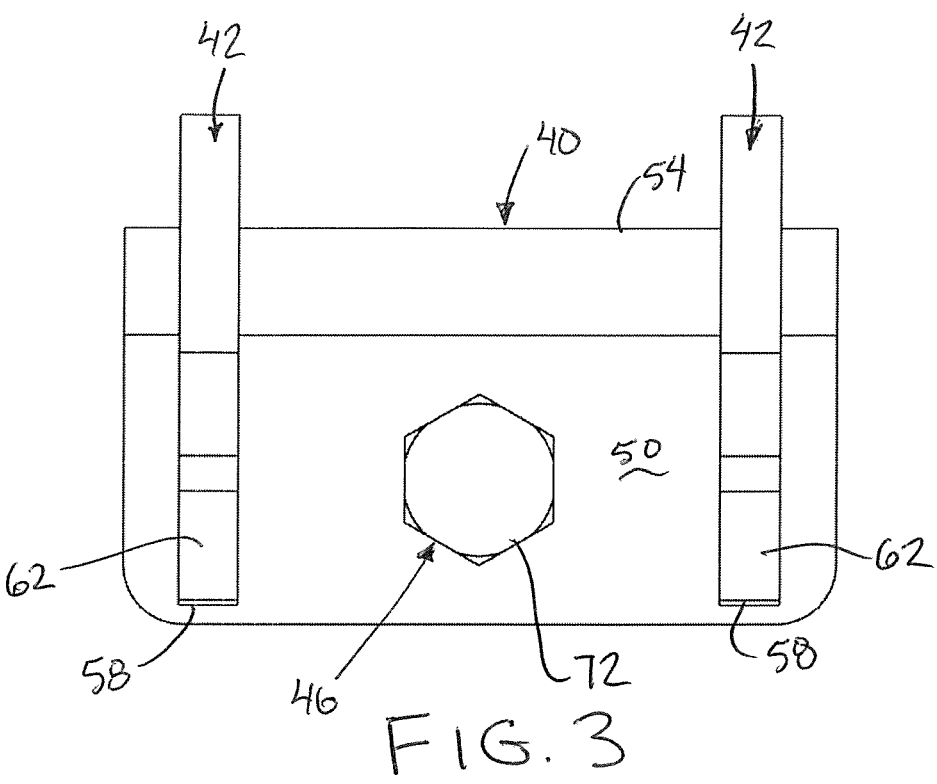
FIG. 3 is a side view of the clamp apparatus according to the first embodiment of FIG. 1.
Figure 4:
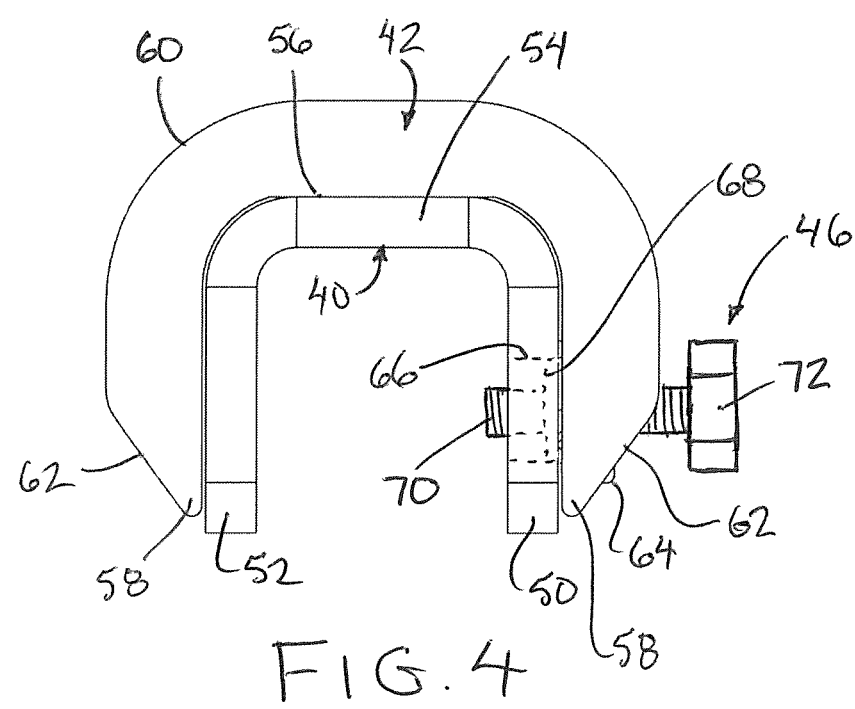
FIG. 4 is an end view of the clamp apparatus according to the first embodiment of FIG. 1.
Figure 5:
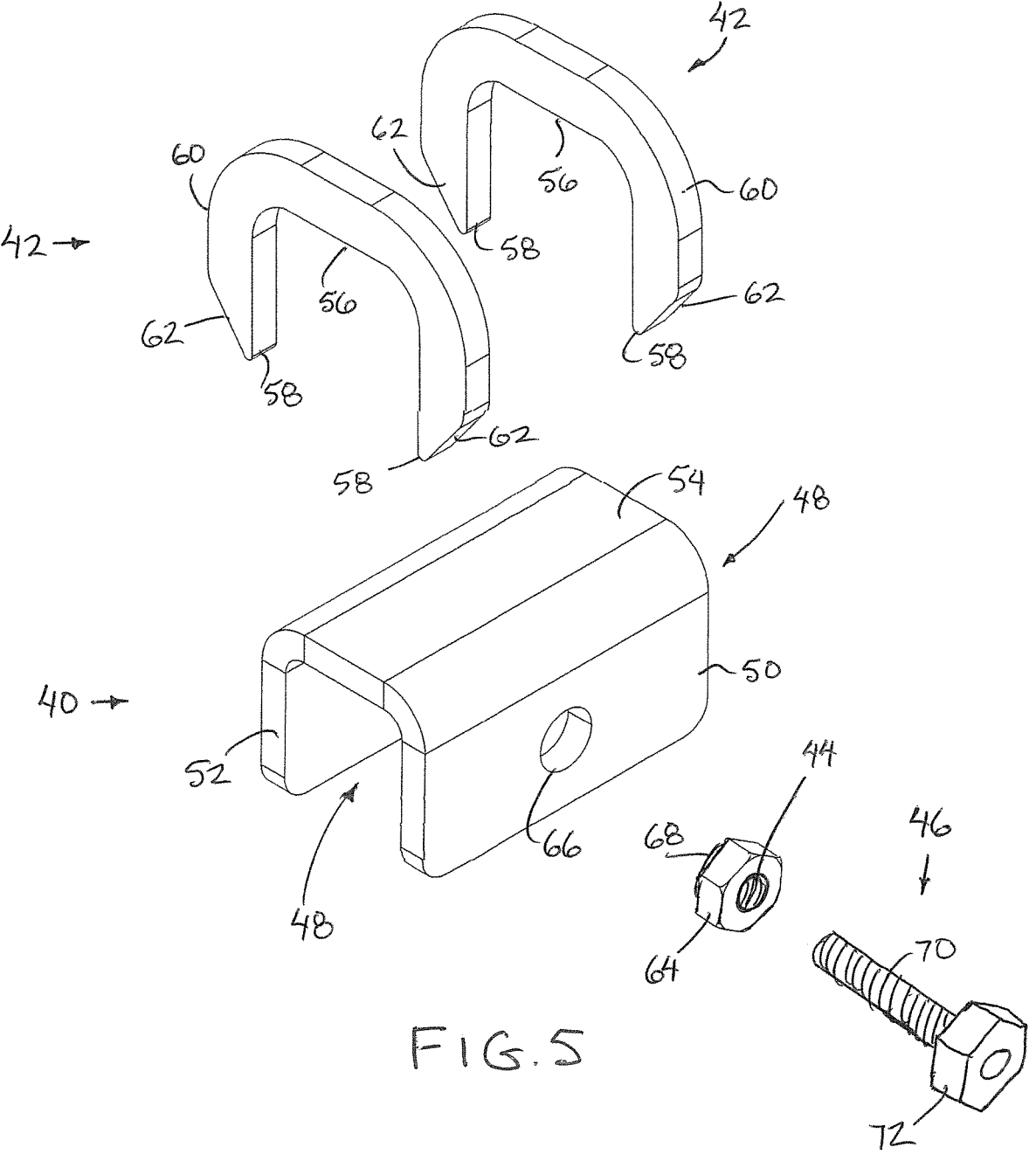
FIG. 5 is a perspective view of the clamp apparatus before assembly of the stiffener plates and the threaded bore onto the channel body by welding.

Referring to the accompanying figures, there is illustrated a clamp apparatus generally indicated by reference numeral 10. The clamp apparatus 10 is well suited for clamping against very high loads while resisting spreading apart of the clamp apparatus. For example, the clamp apparatus 10 is well suited for use in a flexible wall panel system 12 as shown in FIG. 6.

Figure 6:
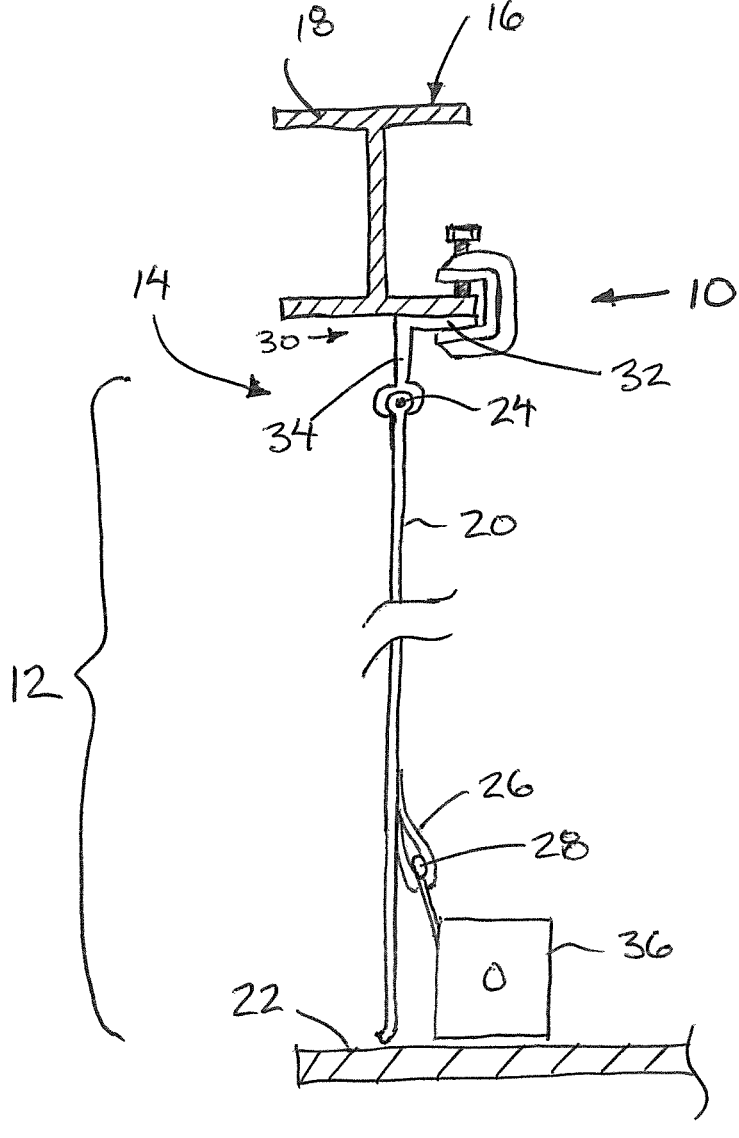
FIG. 6 is a schematic representation of the clamp apparatus according to the first embodiment of FIG. 1 shown securing one end of a flexible wall panel system relative to a perimeter edge of a building opening.

In the illustrated embodiment of FIG. 6, the wall panel system is arranged to span across the building opening 14 in the frame 16 of a building in which the building frame includes a head beam 18 spanning across a top perimeter edge of the building opening. The head beam 18 is an I-beam having a top flange, a bottom flange that is parallel and space below the top flange, and a web connected vertically between the top and bottom flanges. The bottom flange of the head beam 18 in this instance serves as a mounting location for securing the top end of the wall panel system in this instance.

The wall panel system further includes a flexible sheet 20 sized to span across a full height of the opening between the top perimeter edge and bottom perimeter edge 22 of the building opening formed by a floor or other frame member of the building frame. The flexible sheet 20 includes an integral bead 24 of enlarged thickness extending laterally across the top end of the sheet and a pocket 26 formed integrally on an inner side of the sheet to an across the width of the sheet in proximity to an opposing second and or bottom end of the sheet. The pocket receives a suitable frame member 28 therein which spans laterally across the sheet.

A mounting member 30 is provided for securing the top edge of the flexible sheet 20 relative to the head beam 18. The mounting member is a rigid angle having a first mounting flange 32 suitable for being clamped against a bottom of the bottom flange of the head beam 18 and a second depending flange 34 having a channel formed therein that matingly receives the bead 24 of the flexible sheet therein in a mounted position of the wall panel system. A plurality of the clamp apparatuses 10 are mounted at spaced apart positions along the length of the mounting member 30 for clamping the mounting member to the bottom flange of the head beam.

The wall panel system further includes one or more tensioning mechanisms 36 mounted in fixed relation to the building frame at the bottom perimeter edge 22 of the opening for adjustable connection relative to the frame member 28 within the pocket 26 at the bottom of the flexible sheet 20. The tensioning mechanism can be tightened using a winch mechanism with straps secured to the frame member 28 so that tightening of the winch tensions the straps and in turn applies a lengthwise tension between the top and bottom ends of the flexible sheet for tensioning the flexible sheet across the building opening. The tension acts in a direction to spread the clamp apparatuses 10; however, the design of the clamps prevents the spreading of the clamps to hold and maintain the tension in the flexible sheet.

Each clamp apparatus 10 generally includes (i) a clamp body 40 which is generally U-shaped to form the main body of a C-clamp, (ii) a plurality of stiffener plates 42 which are mounted externally on the channel body 40 for stiffening the channel body, and (iii) a threaded bore 44 formed on the channel body for mounting a threaded member 46 in threaded connection therein such that the threaded member acts as a first clamping jaw that is movable relative to a second clamping jaw defined on the channel body.

The channel body 40 comprises a section of prescribed length cut from a stock U-shaped channel member, for example a channel member which has been bent and cold formed from cold rolled metal plate or a channel member which has been extruded. The channel body has a U-shaped profile along the full length thereof in the longitudinal direction between two opposing ends 48. The body is generally comprised of (i) a first plate 50 spanning the length of the channel body along a first side, (ii) a second plate 52 spanning the length of the channel body along a second side parallel and opposite to the first side, and (iii) a bridge plate 54 connected between a first side edge of the first plate and a first side edge of the second plate 52 along the full length of the plates in the longitudinal direction. The resulting channel body thus has a hollow interior extending longitudinally between openings at the two opposing ends 48 while also being fully open along one side of the body between second/free edges of the first plate 50 and the second plate 52 opposite from the bridge plate 54.

In the illustrated embodiment two stiffener plates 42 are provided on the exterior of the channel body at longitudinally spaced position so as to be located adjacent the opposing ends 48 respectively. Each stiffener plate is a flat plate oriented perpendicularly to a longitudinal axis of the channel body while being mounted externally on each of the first plate, the second plate and the bridge plate of the channel body. Each stiffener plate 42 is cut from a rigid plate material to extend circumferentially partway about the exterior of the channel body.

Each stiffener plate 42 includes an inner edge 56 which is joined to the channel body along a full length of the stiffener plate in the circumferential direction between circumferentially opposed ends 58 of the plate so that the inner edge 56 of each stiffener plate is joined across the full width of the first plate 50, the full width of the second plate 52 and the full width of the bridge plate 54 in the circumferential direction about the channel body. The inner edge 56 is joined to the exterior of the channel body by a continuous weld bead along the full length of the inner edge at both of the opposing faces of each stiffener plate to securely join each stiffener plate to each of the plates of the channel body.

Each stiffener plate extends radially outward from a longitudinal axis of the channel body from the inner edge 56 to an opposing outer edge 60 by a radial distance which is more than two times the thickness of the stiffener plate in the longitudinal direction of the channel body between the opposing faces of the stiffener plate. Each stiffener plate has a substantially constant radial dimension protruding outward from the channel body from the inner edge to the outer edge along the length of the stiffener plate in the circumferential direction between the opposing ends 58 with the exception of two end portions 62 adjacent the two ends 58. At each of the two end portions 62, the radial dimension of the stiffener plate is tapered and reduced in the circumferential direction about the channel body towards the end 58 so that the radial dimension is tapered towards the corresponding second or free edges of the first and second plates 50 and 52 of the channel body.

The threaded bore 44 is mounted on the first plate 50 at a location which is centred in the longitudinal direction of the channel body so as to be similarly centred longitudinally between the two different or plates 42. The threaded bore 44 is defined by internal threading within a pre-formed nut 64 which is mounted externally on the first plate by welding such that the axis of the threaded bore 44 lies perpendicularly to the first plate 50. The internally threaded bore 44 within the nut 64 is aligned with a through bore 66 which is formed within the first plate prior to mounting of the threaded nut 64. The through bore 66 as a larger inner diameter than the threaded bore 44 so as not to interfere with threading of the threaded member 46 into and out of the threaded bore 44.

When the threaded nut 64 is provided with a preformed annular rim 68 at one end thereof, the inner diameter of the through bore 66 closely matches the outer diameter of the rim 68 so that the rim 68 can be inserted into the outer end of the through bore 66 for aligning the nut 64 relative to the channel body prior to welding. Once the nut 64 is positioned with the rim 68 aligned within the through bore 66, the nut 64 is secured to the first plate by welding a continuous weld bead about the perimeter of the nut between the nut and a corresponding external surface of the first plate 50.

The threaded member 46 comprises a bolt having a threaded shaft 70 with a hexagonal head 72 at one end of the shaft. The shaft 70 is externally threaded to mate with the internal threading of the nut 64 so that the threaded member can be threaded into the nut with the inner end of the threaded member protruding into the hollow interior of the channel body to define the clamping surface of the first jaw of the clamping apparatus which is parallel and opposite to the inner surface of the second plate that defines the clamping face of the opposed second jaw. Rotating the threaded member 46 by attachment of a tool to the head 72 thereof acts to tighten the first jaw towards the second jaw to clamp the mounting flange 32 of the mounting member 30 parallel and flat against the bottom flange of the head beam 18 when the bottom flange and the mounting flange are received together within the hollow interior of the clamp body.

As described herein, the channel body 40 is manufactured by cutting the channel body 40 as a section of prescribed length from a stock U-shaped channel member. The stiffener plates are then cut from a stock plate and welded externally onto the channel body so as to be joined to all three plates of the channel body. The through bore 66 is formed in the first plate of the channel body so that the annular rim of the threaded nut 64 can be inserted into the external end of the through bore prior to welding of the nut in fixed relation to the exterior of the channel body. Threading the threaded member 46 into the bore 44 completes assembly of a functioning C clamp described herein.

In the illustrated example, the clamp apparatus 10 is used together with other clamp apparatuses 10 of identical configuration for clamping the mounting member 30 against the head beam 18 of a building opening at longitudinally spaced positions along the head beam. The clamp apparatuses provide sufficient clamping force to resist spreading of the clamp when the mounting member supports a flexible wall panel sheet under tension and when the clamp is further loaded by wind loads applied to the tensioned sheet.

Since various modifications can be made in the invention as herein above described, and many apparently widely different embodiments of same made, it is intended that all matter contained in the accompanying specification shall be interpreted as illustrative only and not in a limiting sense.

The invention claimed is:

1. A clamp apparatus for clamping an object using a threaded member, the clamp apparatus comprising:

a channel body having a C-shaped profile extending along a length of the channel body in a longitudinal direction between opposing ends of the channel, the channel body comprising (i) a first plate extending between the opposing ends along a first side of the channel body, (ii) a second plate extending between the opposing ends along a second side of the channel body, and (iii) a bridge plate joined between the first plate and the second plate along the length of the channel body so as to define the C-shaped profile of the channel body;

the channel body having a hollow interior which is open at the opposing ends of the channel body and which is open along an open side of the channel body opposite to the bridge plate along the length of the channel body between the opposing ends to receive the object to be clamped into the channel body through the open side;

stiffener plates mounted externally on the channel body so as to be spaced apart from one another in said longitudinal direction;

a threaded bore formed on the first plate to threadably receive the threaded member extending therethrough such that the threaded member protrudes into the hollow interior of the channel body to define a first clamping jaw opposite to the second plate which defines a second clamping jaw;

wherein each stiffener plate is joined to each one of the first plate, the second plate and the bridge plate of the channel body to protrude radially outward from each of the first plate, the second plate and the bridge plate, transversely to the longitudinal direction; and wherein each stiffener plate is externally welded onto channel body by weld beads connecting each stiffener plate to each of the first plate, the second plate and the bridge plate of the channel body.

2. The clamp apparatus according to claim 1 wherein the first plate and the second plate of the channel body are parallel to one another.

3. The clamp apparatus according to claim 1 wherein the stiffener plates lie perpendicular to the longitudinal direction of the channel body.

4. The clamp apparatus according to claim 1 wherein the stiffener plates comprise two stiffener plates mounted adjacent the opposing ends of the channel body respectively.

5. The clamp apparatus according to claim 1 wherein the stiffener plates comprise two stiffener plates mounted on longitudinally opposing sides of the threaded bore received therebetween.

6. The clamp apparatus according to claim 1 wherein each stiffener plate extends circumferentially partway about the channel member between two opposing end portions of the stiffener plate and each stiffener plate is tapered in radial dimension at each of the opposing end portions thereof.

7. A method of forming a clamp apparatus, in which the clamp apparatus includes (i) a channel body having a C-shaped profile extending along a length of the channel body in a longitudinal direction between opposing ends of the channel, the channel body comprising (a) a first plate extending between the opposing ends along a first side of the channel body, (b) a second plate extending between the opposing ends along a second side of the channel body, and (c) a bridge plate joined between the first plate and the second plate along the length of the channel body so as to define the C-shaped profile of the channel body, (ii) the channel body having a hollow interior which is open at the opposing ends of the channel body and which is open along an open side of the channel body opposite to the bridge plate along the length of the channel body between the opposing ends to receive the object to be clamped into the channel body through the open side, (iii) stiffener plates mounted externally on the channel body so as to be spaced apart from one another in said longitudinal direction (iv) a threaded bore formed on the first plate to threadably receive the threaded member extending therethrough such that the threaded member protrudes into the hollow interior of the channel body to define a first clamping jaw opposite to the second plate which defines a second clamping jaw, (v) in which each stiffener plate is joined to each one of the first plate, the second plate and the bridge plate of the channel body to protrude radially outward from each of the first plate, the second plate and the bridge plate, transversely to the longitudinal direction, the method comprising:

providing the channel body having the bridge plate connected between the first plate and the second plate thereof; and welding each stiffener plate externally onto channel body such that the stiffener plate is welded to each of the first plate, the second plate and the bridge plate of the channel body.

8. The method according to claim 7 including forming the channel body by cutting a section from an elongate channel member.

9. The method according to claim 7 including forming the threaded bore on the first plate by providing a threaded nut and welding the threaded nut onto the first plate in alignment with a through bore formed in the first plate.

10. A wall panel system for a building opening comprising a perimeter beam with a beam flange extending across a first perimeter edge of the building opening, the system comprising:

a flexible sheet arranged to across the building opening between a first end portion and a second end portion of the flexible sheet;

a mounting member having (i) a mounting flange arranged for abutment alongside the beam flange of the head beam and (ii) a channel arranged to secure the first end portion of the flexible sheet therein;

a plurality of clamp apparatuses arranged for clamping the mounting flange of the mounting member alongside the beam flange of the head beam; and a tensioning assembly arranged to secure the second end portion of the flexible sheet relative to a second perimeter edge of the building opening opposite to the first perimeter edge of the building opening such that the flexible sheet is under tension;

wherein each clamp apparatus comprises:

a channel body having a C-shaped profile extending along a length of the channel body in a longitudinal direction between opposing ends of the channel, the channel body comprising (i) a first plate extending between the opposing ends along a first side of the channel body, (ii) a second plate extending between the opposing ends along a second side of the channel body, and (iii) a bridge plate joined between the first plate and the second plate along the length of the channel body so as to define the C-shaped profile of the channel body;

the channel body having a hollow interior which is open at the opposing ends of the channel body and which is open an open side of the channel body opposite to the bridge plate along the length of the channel body between the opposing ends to receive the object to be clamped into the channel body through the open side;

stiffener plates mounted externally on the channel body so as to be spaced apart from one another in said longitudinal direction;

a threaded bore formed on the first plate to threadably receive a threaded member extending therethrough such that the threaded member protrudes into the hollow interior of the channel body to define a first clamping jaw opposite to the second plate which defines a second clamping jaw;

wherein each stiffener plate is joined to each one of the first plate, the second plate and the bridge plate of the channel body to protrude radially outward from each of the first plate, the second plate and the bridge plate, transversely to the longitudinal direction.

11. The wall panel system according to claim 10 wherein each clamp apparatus is arranged such that the first plate and the second plate of the channel body are parallel to one another.

12. The wall panel system according to claim 10 wherein each clamp apparatus is arranged such that the stiffener plates lie perpendicular to the longitudinal direction of the channel body.

13. The wall panel system according to claim 10 wherein each clamp apparatus is arranged such that the stiffener plates comprise two stiffener plates mounted adjacent the opposing ends of the channel body respectively.

14. The wall panel system according to claim 10 wherein each clamp apparatus is arranged such that the stiffener plates comprise two stiffener plates mounted on longitudinally opposing sides of the threaded bore received therebetween.

15. The wall panel system according to claim 10 wherein each clamp apparatus is arranged such that each stiffener plate extends circumferentially partway about the channel member between two opposing end portions of the stiffener plate and each stiffener plate is tapered in radial dimension at each of the opposing end portions thereof.

* * * * *